Nov. 1, 1949.  H. F. KENNISON  2,486,420
APPARATUS FOR LINING PIPES
Filed April 14, 1945  5 Sheets-Sheet 1

INVENTOR
Hugh F. Kennison
BY
Ernest D. Given
ATTORNEY

Nov. 1, 1949.  H. F. KENNISON  2,486,420
APPARATUS FOR LINING PIPES
Filed April 14, 1945                5 Sheets-Sheet 2

INVENTOR
Hugh F. Kennison
BY Ernest D. Given
ATTORNEY

Patented Nov. 1, 1949

2,486,420

UNITED STATES PATENT OFFICE 2,486,420

APPARATUS FOR LINING PIPES

Hugh F. Kennison, Bloomfield, N. J., assignor to Lock Joint Pipe Company, East Orange, N. J., a corporation of New Jersey Application April 14, 1945, Serial No. 588,316

17 Claims. (Cl. 25—38)

This invention relates to an apparatus for applying a lining of cementitious or other plastic material to a hollow cylinder or pipe by centrifugal action. The apparatus includes a jacket which firmly supports the cylinder to be lined during rotation. Particularly when centrifuging a thin-walled cylinder or shell undesired vibrations and whipping of the shell sometime occur and it is among the objects of the present invention to provide means for rigidly supporting the shell within a jacket to prevent vibration and whipping action. Provision is made for compensating for irregularities in the cylindrical configuration of the shell so as to assure that the whipping action will be eliminated even though the shell employed may not be truly round or may not be concentric to the axis of the rotating unit throughout its length.

Another object of the invention is to round a cylinder and to conform it concentrically with reference to the center of rotation of the centrifuging apparatus.

Another object of the invention is to provide a means whereby two or more sections may be lined simultaneously. In carrying out the method two sections comprising cylinders or shells are temporarily connected together and supported intermediate their ends as well as at their ends in a centrifuging jacket. If only one section shorter than the over-all length of a standard section is desired, one of the joined cylinders may be a pipe, complete with lining, and serving as a dummy, with the result that a single jacket may be employed for producing short lengths of pipes as well as pipes of a standard length. The same principle is also useful in lining bevelled sections, such as are used for making deflections in the alignment of a pipe line consisting of a series of connected pipes. For accomplishing this the terminal ends of the bearing rings of the cylinders are pitched with respect to the axis of the shells to form bevelled ends for the cylinder. A bevelled end of a cylinder is temporarily joined by a complementary joining member which is supported at its other end by a demountable ring of the centrifuging jacket. The cylinder being lined may be bevelled at one, or at both ends, and it is preferably supported and centralized within the jacket by means of a girth ring, and adjustable engaging devices which extend inwardly of the wall of the jacket.

A further accomplishment of the invention is in the construction of the jacket and rings in the jacket which support the shell whereby the jacket and rings and supported cylinder may be removed from the apparatus as a unit and stood on end so that the jacket may be removed from the cylinder to enable its immediate use for another centrifuging operation. This results in having the apparatus continuously available for centrifuging a series of cylinders without intervening periods of non-use and consequently reduces operating costs. The apparatus includes devices for safely holding together the shell and end rings which form the mold during a centrifuging operation, and also provides means for sealing the ends of a cylinder to assure that leakage will be a minimum while the lining material is being placed and during rotation.

Other objects of the invention will be set forth in the accompanying specification and claims and demonstrated by the drawings which show by way of illustration a preferred embodiment and the principle of my invention and what I now consider the best mode in which I contemplate applying that principle. It is to be understood that the drawings are for the purpose of illustration and are not intended as a definition of the limits of the invention.

Referring to the drawings.

Figures 1, 5:
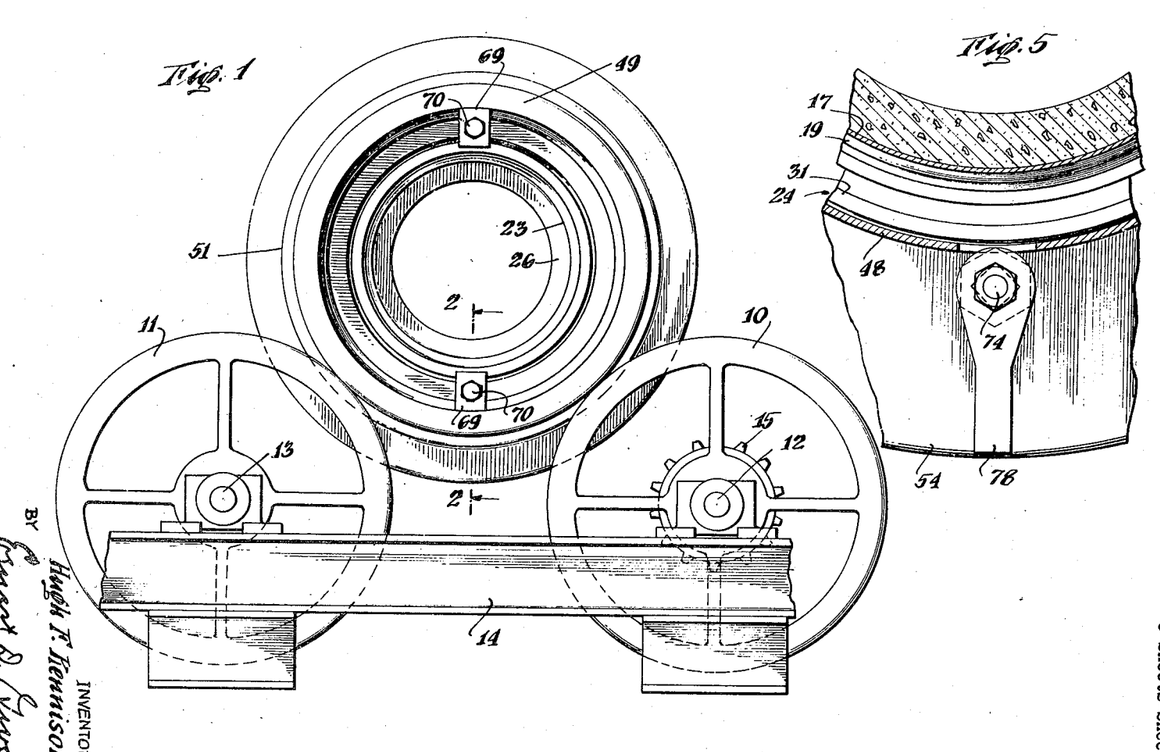
Fig. 1 is an end view of the apparatus.
Fig. 5 is a section on line 5—5 of Fig. 2.

The centrifuging jacket of the apparatus is mounted upon two pairs of rollers which are driven to cause the rotation of the jacket and its contained cylinder. Two of the rollers 10 and 11 are shown in Fig. 1 and a similar pair of rollers is located adjacent the other end of the centrifuging jacket. These rollers are mounted on shafts 12, 13 which are carried in bearings supported by a frame 14. The locations of the longitudinally separated pairs of rollers are indicated at 10 and 16 in Fig. 2. At least one of the rollers is driven by a motor through a sprocket wheel 15, Fig. 1.

Figure 2:
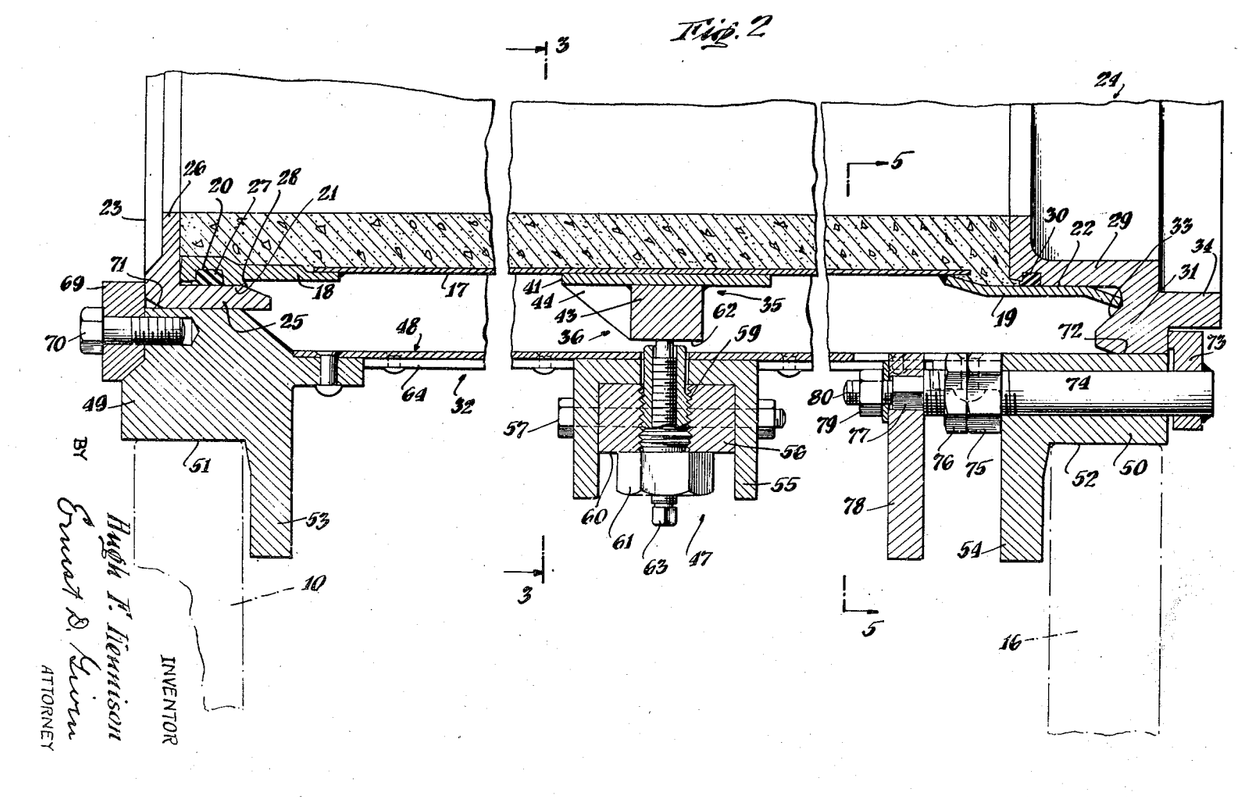
Fig. 2 is a longitudinal section on a vertical plane through the lower portion of a centrifuging jacket and contained cylinder.
Figure 3:
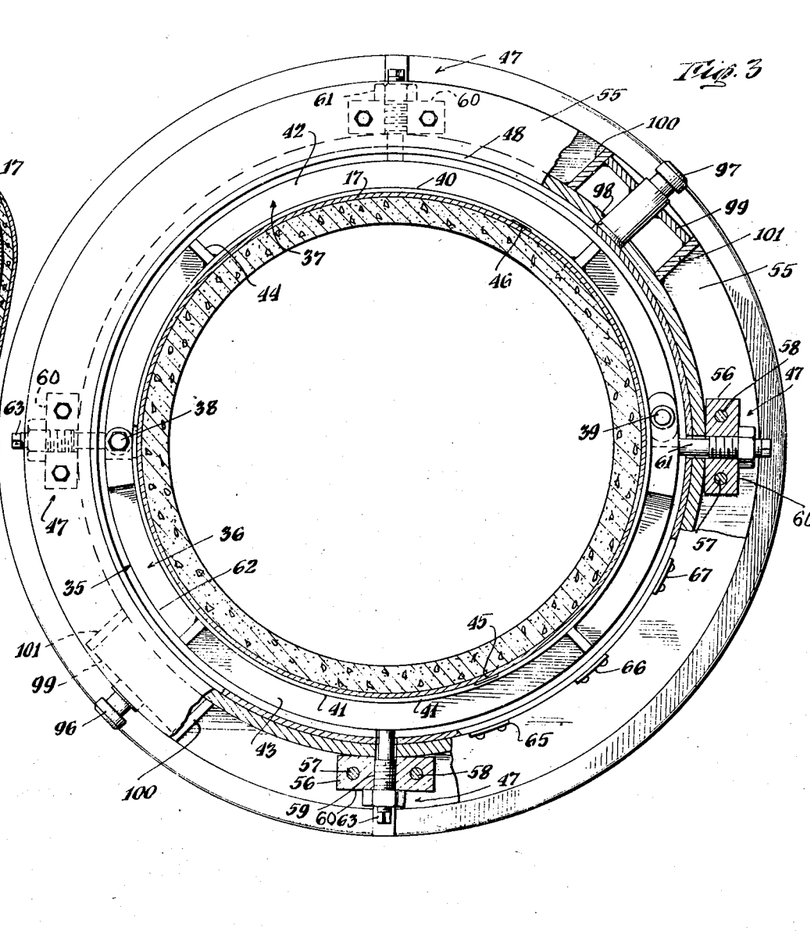
Fig. 3 is a vertical section of the jacket on line 3—3 of Fig. 2.

The apparatus is particularly suited for applying a lining of concrete or of other cementitous material to the interior of a steel cylinder or tubular shell of a pipe. As shown in Figs. 2 and 3, the wall to be lined is a steel sleeve 17 to which joint rings 18 and 19 are welded entirely around their circumferences. The sleeve is formed by a rolled plate with longitudinal edges welded together. In the particular pipe illustrated, the joint ring 18 forms the spigot end of the pipe and is provided with a gasket-receiving recess 20. The joint ring 19 is in such a form as to provide the bell at the other end of the pipe. These joint rings are made of steel and their bearing surfaces 21 and 22 are cylindrically trued to engage corresponding bearing surfaces of similar pipes. The product of the apparatus may be a completed pipe or a lined sleeve to be used in the manufacture of a prestressed reinforced concrete pipe of the character described in United States Patent 2,348,765. So far as some aspects of the present invention are concerned it is immaterial whether or not the cylinder to be lined is of one piece or has bell and spigot rings attached to a cylinder.

For fitting the steel cylinder of the pipe onto the apparatus, a pair of end rings 23 and 24 are provided. End ring 23 has an axially extending flange 25 and a radially extending portion 26 which, respectively, engage the bearing surface 21 of the spigot ring and the end of the spigot ring, Fig. 2. Flange 25 is sufficiently long to extend beyond a rubber gasket 27 by which a seal is produced between the steel shell of the pipe and the end ring. Flange 25 is tapered at its free edge 28 to force gasket 27 into its receiving groove 20 when the ring is being applied over the end of the spigot ring.

Ring 24 has an axially extending portion 29 providing a circular surface which fits within the interior bearing surface 22 of the bell ring 19. End ring 24 is provided with a gasket-receiving recess 30 which accomodates a rubber gasket for sealing between the bell ring and the end ring 24. End ring 24 has an outwardly-extending portion 31 by which the pipe and the end ring are supported in the jacket 32 of the apparatus. Portion 31 of the end ring is provided with a re-entrant surface 33 against which the end of the bell ring 19 abuts. The end ring also is provided with an axially-extending flange 34 which terminates beyond the right end of the jacket 32 and its associated parts, Fig. 2. The porion 34 serves as a base for supporting the pipe and jacket when they have been removed from the rollers and are stood on end, as will be explained hereinafter.

Figure 4:
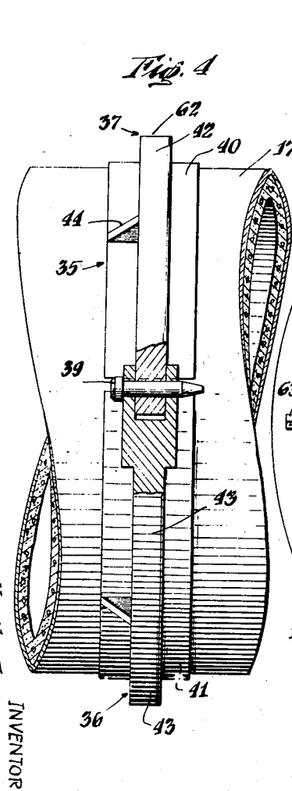
Fig. 4 is an edge view of a girth ring.

In order to rigidly support the wall of the cylinder during centrifuging and to correct for any irregularities between the concentricity of the cylinder and the jacket, I employ encircling bands or girth rings which are placed about the cylinder before the cylinder is placed in the jacket. One of these girth rings 35 is shown in Figs. 2, 3 and 4. When the cylinder is comparatively thin, or the length of the cylinder is several times its diameter, it is of advantage to have more than one girth ring in spaced relationship longitudinally thereof.

Some prestressed concrete pipes employ a cylinder or sleeve within the wall of the pipe which is formed from relatively thin sheet steel, say, of a thickness of about 18 gauge. Sometimes the cylinder is not truly round throughout its length and sometimes the cylinder may be bowed lengthwise so that all portions are not concentric crosswise of the cylinder. One purpose of the invention is to eliminate such irregularities before a concrete lining is placed so that when the concrete hardens the pipe will be symmetrical and correctly formed.

Whatever correction may be necessary is obtained either through the constraining effect of the girth ring on the cylinder or by adjusting the girth ring and embraced cylinder radially of the true axis of the shell by the cooperative influence of the jacket on the girth ring. The band of each girth ring has a predetermined radial thickness determined by concentric and circularly true inner and outer surfaces, the diameter of its inner surface corresponding to the outer diameter of the cylinder, and the diameter of its outer surface being such as to cooperate with displaceable engaging devices carried by jacket 32, which, when adjusted, place and hold the girth ring and its embraced portion of the cylinder concentric of the true axis of the cylinder and rotary portions of the apparatus. The girth ring is best seen in Figs. 3 and 4.

Each girth ring consists of two semi-circular parts 36 and 37 which are pinned together by a bolt 38 and by a removable pin 39. The bolt and pin pass through holes at the respective ends of the semi-circular parts 36 and 37. Pin 39 is tapered at one end to facilitate its engagement when the girth ring is being placed about the shell. While the girth ring may be variously formed, I prefer to employ bands of metal 40 and 41 which are rolled into semi-circular shape and to which are attached heavy bars 42, 43 which are similarly rolled. Each bar is joined to its associated band by welded connections. The inside diameter of the girth ring is machined cylindrically true to correspond with the exterior diameter of the cylindrical shell 17 of the pipe. The inside surfaces of the bands 40, 41 may be notched with shallow grooves, such as at 45, 46, to straddle longitudinal welds in the wall of the cylinder. The girth ring is provided with pilots 44 in the form of plates, each having a sloping edge to prevent the jacket from catching on the girth ring as the jacket is lowered over the cylinder and girth ring during assembly. It will be understood that the girth rings are so placed upon the pipe as to be located opposite from the engaging devices 47 which are mounted upon jacket 32 and which will be described hereinafter.

The jacket includes a sleeve 48 which is secured at its ends to runner rings 49 and 50. Each runner ring has a true cylindrical surface 51, 52, which engages with the rollers of the apparatus whereby the jacket and its contained pipe are rotated. Flanges 53 and 54 on the respective rings 49 and 50 face the inside surfaces of the rollers as illustrated in Fig. 2.

The engaging devices 47 of each set of engaging devices are spaced circumferentially around the jacket in a diametrical plane. When an odd number of girth rings are employed a ring of engaging devices would be located at or near the mid-length of the jacket. While the sleeve of the jacket may be variously formed and made sufficiently rigid, it is preferable to employ stiffening means for supporting each set of engaging devices. For stiffening purposes a ring can be welded or riveted to the sleeve. The stiffener ring 55 shown in Fig. 2 consists of a cast channel member.

Four engaging devices are illustrated in Fig. 3. Each of these engaging devices includes a block 66 which is fastened to and between the flanges of the channel member 55 by means of bolts 57 and 58. The block 56 is provided with a tapped hole 59 for receiving the stem of a cap screw 61 which extends inwardly of the jacket through a drilled hole in the web of the channel member and the sleeve 48 when a cylinder has been mounted in the jacket.

The outer surfaces 60 of all of the blocks 56 are located at the same distance from the axis of the jacket and runner rings and the length of cap screws 61 is such as to locate an engaged girth ring concentric to that axis when the caps of all of the screws are seated against the blocks. However, when the cylinder 17 and the surface 62 of the girth ring are eccentric with respect to the jacket, the stem of screw 61 at one side of the shell will be short of the surface 62 of the girth ring when the screw is seated against block 56. If further tightening of all of the screws 61 does not fully correct the eccentricity, the set screw 63 of any non-touching cap screw is advanced into contact with the girth ring whereby the cylinder is supported at diametrically opposite points. The cylinder is thereby held securely by each girth ring regardless of its possible lack of true concentricity. The functioning of a set screw 63 in this manner is illustrated in Fig. 2.

In the event that the sleeve 48 of the jacket is made of relatively light material, it is desirable that it be stiffened so that the stiffener ring 55 will be rigidly supported. The sleeve may be stiffened by attaching thereto a plurality of strips of metal such as 64, 65, 66, 67, etc., circumferentially spaced therearound. Inasmuch as the principal function of the jacket is to connect the runner rings and provide rigidity for the stiffener ring, it is apparent that sleeve 48 may be formed as an open frame with bars extending between and connecting the runner rings.

It will be noted that the inner diameter of runner ring 50 is such as to accommodate the passage of the pipe and its associated girth ring 35 when the shell of the pipe is being placed within the jacket. When within the jacket, spigot ring 18 abuts end ring 23 which bears against a plurality of dogs 69 spaced around and fastened to runner ring 49 by cap screws 70. It is important that the pipe and associated rings be held firmly in position within jacket 32 and to assure this the bearing surfaces 71 and 72 between the respective rings at the ends of the apparatus may be machined if necessary to provide a close sliding fit. In order to prevent axial displacement of the pipe relative to the jacket a plurality of dogs 73, one of which is shown in Fig. 2, are brought to bear against the radial surface of end ring 24. Each of these dogs 73 is fixedly secured to the end of a threaded rod 74 which is carried by runner ring 50. A nut 75 engages the thread of the rod and draws the dog 73 into tight engagement with ring 24 and the tightened position of nut 75 is maintained by a lock nut 76.

The free end of rod 74 is provided with flat surfaces 77 beyond the threads which are engaged by nuts 75 and 76. Each finger member 78 is holed for the purpose of engaging the flat surfaces 77 and the finger 78 is thereby held from rotation with respect to its supporting rod. The relation of finger 78 to rod 74 is such that the rod will extend radially from the axis of the casing when dog 73 is in engagement with the ring 24, as shown in Fig. 2. Finger 78 is held in place by a nut 79 which is fastened to a reduced threaded portion 80 of rod 74. The purpose of finger 78 is to provide a weighted member which assures that dog 73 can not turn during centrifuging action in the event that the nuts 75 and 76 become loose. The disposition of the weight of finger 78 is such that the centrifugal action thereon will cause dog 73 to remain engaged with ring 24 even though nut 75 becomes loose.

Figure 6:
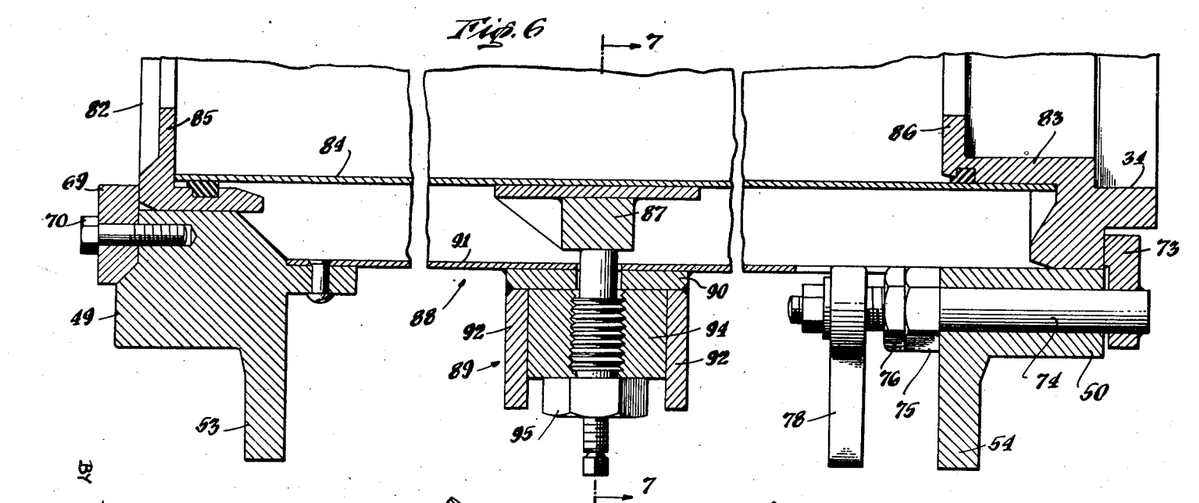
Fig. 6 is a vertical longitudinal section of a centrifuging jacket modified to accommodate a straight-walled cylinder.
Figure 7:
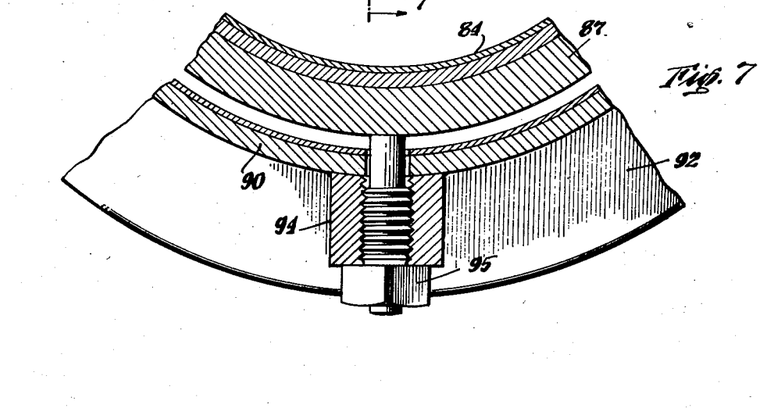
Fig. 7 is a section on line 7—7 of Fig. 6.

In the modification of the invention illustrated in Figs. 6 and 7, the demountable end rings 82 and 83 are so formed as to accommodate and seal the ends of a hollow cylinder or tube 84 which has a uniform cross-section throughout its length. The inwardly extending legs 85 and 86 of the end rings 82 and 83, respectively, determine the longitudinal dimension of the lining which may be as thick as the radial height of the legs. Girth rings 87 are employed as necessary. The jacket may be constructed as previously described. The stiffening means 89 is formed from a band of steel 90 which engages and is fastened to the exterior of the jacket. Stiffening rings are built up by attaching to the band 90 a pair of radially-extending rings 92 which are welded to the band 90. The blocks 94 of the engaging devices are welded in place and circumferentially distributed about the jacket. The screw 95, which engages the girth band, is shown in Figs. 6 and 7 as in normal contact with the girth band, that is, with its stem engaging the girth band and the cap of the screw seated against the block.

Figures 8, 9, 10:
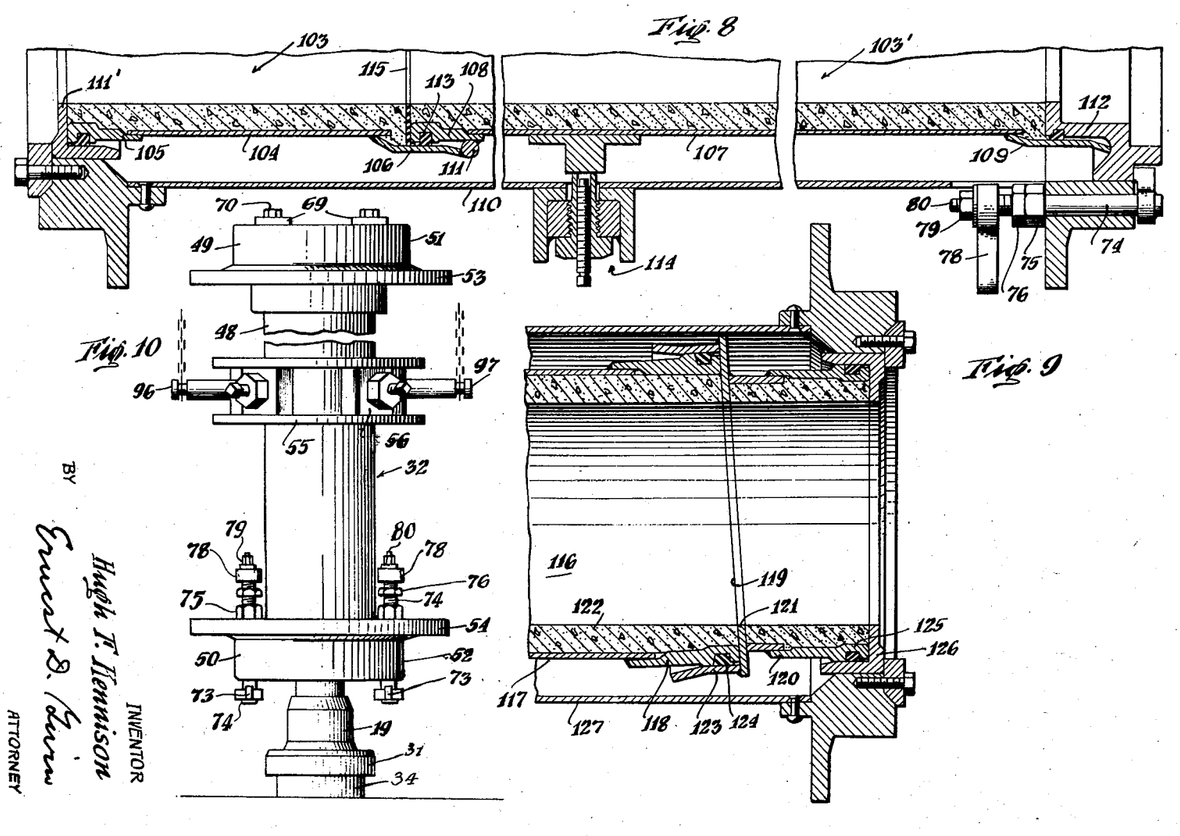
Fig. 8 is a longitudinal section similar to Fig. 2 and showing the manner of lining short lengths of pipes.
Fig. 9 is a longitudinal section through one end of a centrifuging jacket and illustrating the manner of lining bevelled pipe.
Fig. 10 illustrates the removal of the jacket from a lined pipe.

Following a centrifuging operation the jacket and its contained pipe may be lifted from the rollers by a hoist having a bridle with chains and hooks for engaging trunnion pins 96 and 97, Figs. 3 and 10, which are mounted on and secured to diametrically opposite locations on the stiffener ring of the jacket which is in mid-position along the length of the jacket. The inner end of each trunnion pin 96, 97 is mounted in a hole 98 which is drilled in the web of channel member 55, Fig. 3. A plate 99 likewise is drilled for the passage of the trunnion pin and this plate is fastened to the flanges of the channel member 55 at opposite sides of the plate. Other sides of plate 99 are fastened to plates 100 and 101 which extend between the flanges of channel member 55 and together with the flanges of channel member 55 form a box for supporting the trunnion pin. The trunnion pin is welded in place and the plates forming the box-like enclosure are welded to each other and to the channel member.

When the jacket and enclosed cylinder are lifted from the rollers of the apparatus they are carried to one side and the jacket is turned on its trunnion pins into a vertical position and set upon the ground with end ring 24, Fig. 2, or 83, Fig. 6, lowermost. The jacket is turned more easily if the trunnions are located a slight distance from the center of gravity. In this position the base 34 of the end ring supports the entire assembly clear of the ground.

It then is possible to loosen dogs 73 and turn them sufficiently to clear the periphery of the end ring. After the engaging devices 47 have been released from engagement with the girth ring, the jacket can be lifted from the pipe which will remain in a vertical position, as supported by the lower end ring. The pipe may be left in this position while the concrete lining cures and the jacket of the apparatus is immediately available for another centrifuging operation, it being necessary only to have additional end rings, such as 24 and 83, available for this purpose.

It frequently is desirable to produce lengths of pipe shorter than the standard of length of pipe normally used in a given pipe line, and this can be accomplished with the apparatus of the present invention. Assuming that the apparatus is proportioned for producing sections of pipe 16 feet long, two sections, say, one of 10 feet and one of 6 feet length may be lined during one centrifuging operation. The manner of doing this is illustrated in Fig. 8, in which is shown two lengths of short pipe 103 and 103′. Section 103 includes a steel sleeve 104 and spigot and bell rings 105 and 106, respectively. Section 103′ includes a steel cylinder formed of a sleeve 107 and attached spigot ring 108 and bell ring 109. Before these sections are introduced within the jacket 110, they are joined by joining ring 111 which is temporarily connected by welding to the spigot 108 and bell 106 of the joined pipe sections. As joined, the two sections have a length which corresponds to the standard length of pipe sections for which the apparatus is designed.

The joined sections are introduced within the jacket with their ends supported by demountable end rings 111′, 112 of the apparatus. The ends of the joined section are sealed by gaskets in the manner previously described and a gasket 113 is also employed between the two joined sections. Any irregularity in the eccentricity of the joined sections is corrected by means of the engaging devices 114. After the screws of these engaging devices have been properly adjusted, the joined sections will be rigidly held against displacement during their rotation. In order to provide a separation between the linings of the two sections, a thin gasket 115 is placed against the end of spigot ring 108. This gasket may be made of rubber or composition material suitable for its function. The lining may be applied by rotating the jacket and contained sections, while at the same time introducing plastic cementitious material within the sections and in sufficient amount to produce the desired wall thickness.

It is also apparent that if short sections of one length only are desired, one or the other of the short sections may constitute a dummy which already has as a part thereof previously-applied lining. In this case the plastic material would be introduced only within the section of pipe which is to be lined. After the centrifuging operation is accomplished, the joined pipe sections are removed from the jacket in the manner previously described and they are disconnected by removing the temporary joining ring 111.

In Fig. 9 I have illustrated the manner of lining sections of pipes having bevelled ends. One end of such a section is shown at 116. A shell 117 is connected to a spigot ring 118 which terminates at 119 in a plane which is bevelled with respect to the axis of the section. This end of the bevelled section is supported by a dummy section 120 carrying an apertured ring 121 which is parallel to the terminal end 119 of the spigot ring. This annular ring forms a wall at the bevelled end of section 116 and the aperture therein determines the thickness of the lining material 122 which is to be applied to the bevelled section. The spigot and bell rings 118 and 123 are joined and sealed by a gasket 124 in the usual manner. Section 120 has a square end provided with a spigot ring 125 which is sealed against and supported by a demountable end ring 126 of the centrifuging apparatus. The dummy section 120 may be lined or not. Section 116 is lined by introducing plastic material to the interior thereof during the rotation of the jacket 127. The bell end of section 116 may be square and supported in the jacket as shown at the right end of Fig. 8. If bevelled, a dummy section similar to 120, but with a bevelled spigot ring in place of the bell ring, may be used.

For the purpose of describing my invention I have illustrated in the drawings pipes having spigot and bell ends, but it is to be understood that the invention is susceptible of use for making double spigot pipes and double bell pipes, and that various other changes and modifications in construction, form and relative arrangement of parts, which will now appear to those skilled in the art, may be made without departing from the scope of the invention. Reference is, therefore, to be had to the appended claims for a definition of the limits of the invention.

What is claimed is:

1. Apparatus for centrifugally lining hollow cylinders comprising, in combination, a hollow jacket having a runner ring at each end for revolvably mounting the jacket on rollers, end rings carried by said jacket and removable from engagement with said jacket, said end rings extending between said runner rings and a hollow cylinder to be lined for laterally supporting the ends of the hollow cylinder within said runner rings and also having portions bearing axially against the ends of the hollow cylinder, means carried by said jacket for holding said end rings in place in said jacket and against the ends of a hollow cylinder to be lined, a girth ring for encircling and engaging said hollow cylinder intermediate its length, and means carried by said jacket for steadying said hollow cylinder during rotation, said means including devices displaceable into engaging relationship with said girth ring for restraining said girth ring and hollow cylinder from whipping during rotation.

2. Apparatus for centrifugally lining hollow cylinders comprising, in combination, a hollow jacket having a runner ring at each end for revolvably mounting the jacket on rollers, end rings carried by said jacket and removable from engagement with said jacket, said end rings extending between said jacket and a hollow cylinder to be lined for laterally supporting the hollow cylinder at its ends and also having portions bearing axially against the ends of the hollow cylinder, means carried by said jacket for holding said end rings in place in said jacket and against the ends of a hollow cylinder to be lined, a girth ring for encircling and engaging said hollow cylinder intermediate its length, a stiffener ring secured to said jacket radially opposite from said girth ring, and a plurality of devices spaced circumferentially on said stiffener ring and having adjustable elements extending through said jacket for engaging said girth ring.

3. Apparatus for centrifugally lining hollow cylinders comprising, in combination, a hollow jacket having a runner ring at each end for revolvably mounting the jacket on rollers, demountable end rings carried by said jacket for engaging the ends of a cylinder to be lined, said end rings extending between said jacket and a hollow cylinder to be lined for laterally supporting the hollow cylinder within said jacket, means carried by said jacket for holding said end rings in place in said jacket and against the ends of a hollow cylinder to be lined, a girth ring for encircling said hollow cylinder intermediate its length, a stiffening means encircling said jacket and located thereon opposite from said girth ring, a plurality of devices comprising independently adjustable screws spaced circumferentially about said stiffening means and extending through said jacket for exerting pressure between said jacket and said girth ring, and a pair of trunnion pins radially extending from diametrically opposite points on said stiffening means.

4. Apparatus for centrifugally lining hollow cylinders comprising, in combination, a jacket for containing a hollow cylinder to be lined, said jacket having runner rings at its ends, end rings mounted on said runner rings and adapted to support said hollow cylinder, a girth ring surrounding said hollow cylinder intermediate its ends, a stiffener ring surrounding said jacket and located opposite from said girth ring, and a plurality of devices carried by said stiffener ring and spaced from one another about said ring, each of said devices including a nut fastened to said stiffener ring and compound screw elements axially movable with respect to said nut and to each other with one of said screw elements engaged in said nut whereby either one of said screw elements may be adjusted for bearing upon said girth ring.

5. Apparatus for centrifugally lining hollow cylinders comprising, in combination, a hollow jacket having a runner ring at each end for revolvably supporting said jacket, end rings engaged by walls of annular openings in said runner rings, said end rings being supported by and axially removable from said runner rings, means carried by one of said runner rings for preventing movement of its associated end ring axially outward from said jacket, means carried by the other of said runner rings for preventing movement of its associated end ring axially in the opposite direction, said last-named means including a dog and a rod rotatably mounted in a hole in said last-mentioned runner ring, means for holding said dog in contact with its associated end ring, and means effective under centrifugal action for preventing said rod and dog from rotating from holding position during rotation of said jacket.

6. Apparatus for centrifugally lining hollow cylinders comprising, in combination, a jacket for containing a hollow cylinder to be lined, said jacket having runner rings at its ends, end rings mounted in said jacket and adapted to engage the ends of said hollow cylinder and support said hollow cylinder, said end rings being axially removable from said jacket through said runner rings, means for holding said end rings and cylinder against axial movement outward from said jacket, said holding means being carried by and located at the ends of said jacket, the said last-named means located at one end of said jacket including a dog and a rod rotatably mounted on said jacket and adapted for movement to and from holding position, and means effective under centrifugal action for preventing said rod and dog from rotating from holding position during rotation of said jacket.

7. Apparatus for centrifugally lining hollow cylinders comprising, in combination, a hollow jacket having a runner ring at each end for revolvably supporting the jacket, said runner rings having annular openings differing in size, end rings removably engaged by walls of said annular openings in said runner rings, each of said end rings having a cylindrical bearing surface for engaging respective walls of said annular openings, means carried by said runner rings for engaging said end rings to hold them in said jacket, and a girth ring for engaging a hollow cylinder intermediate its length, the periphery of said girth ring being of less diameter than the diameter of the largest of said annular openings of said runner rings so as to enable passage of the hollow cylinder with end rings and girth ring through the runner ring having the largest annular opening after the holding means carried by said last-mentioned runner ring have been released from engagement with its associated end ring.

8. Apparatus for centrifugally lining hollow cylinders comprising, in combination, a jacket for containing a cylinder to be lined, said jacket having fixed thereto members with annular openings encircling the ends of said cylinder, the annular openings of said encirculing members having different diameters, end rings removably mounted in the annular openings of said encircling members for supporting said cylinder, means for holding said end rings against axial displacement with respect to said encilcling members, means for stiffering said jacket, said stiffening means being attached to said jacket and located intermediate its ends, a girth ring for encircling said cylinder immediately opposite said stiffening means, a plurality of devices carried by said stiffening means and spaced from one another on said stiffening means, each of said devices being engageable with said girth ring, and means carried by said jacket whereby said jacket, cylinder-encircling members, cylinder and attached end and girth rings may be lifted as a unit.

9. Apparatus for centrifugally lining hollow cylinders comprising, in combination, a jacket for containing a cylinder to be lined, said jacket having fixed thereto members with annular openings encircling the ends of said cylinder, end rings removably mounted in the annular openings of said encircling members for supporting said cylinder, means for holding said end rings against axial displacement with respect to said encircling members, stiffener ring attached to the exterior of said jacket, a girth ring surrounding said cylinder immediately opposite said stiffener ring, a plurality of devices carried by said stiffener ring and spaced from one another on said stiffener ring, each of said devices being engageable with said girth ring, and a pair of trunnion pins secured to said stiffener rings at diametrically opposite locations thereon whereby said jacket, cylinder-encircling members, cylinder and attached end and girth rings may be lifted as a unit.

10. Apparatus for centrifugally lining hollow cylinders comprising, in combination, a jacket, runner rings for revolvably supporting said jacket on rollers, a pair of demountable end rings having peripheral surfaces for engaging interior surfaces of said runner rings, means cooperating with each of said end rings for holding a hollow cylinder to be lined, said means including devices between said runner rings and end rings for forcing said end rings axially against the ends of said cylinder, a girth ring surrounding the hollow cylinder intermediate its ends, and a plurality of devices for engaging said girth ring, said engaging devices being carried by said jacket and spaced circumferentially about said jacket opposite said girth ring, said engaging devices including a screw passing inwardly of said jacket and adjustable from the exterior of said jacket for contacting said girth ring.

11. Apparatus for centrifugally lining hollow cylinders comprising, in combination, a jacket, runner rings for revolvably supporting said jacket, a pair of end rings having peripheral surfaces for engaging interior surfaces of said runner rings and cooperating with means carried by said jacket for holding a hollow cylinder therein, a girth ring for encircling a hollow cylinder intermediate its ends, and a plurality of devices for engaging said girth ring, said engaging devices being carried by said jacket and spaced circumferentially about said jacket opposite said girth ring, said engaging devices including a screw passing inwardly of said jacket and adjustable from the exterior of said jacket for contacting said girth ring, and a second screw extending through a hole in said first screw for engaging said girth ring when said first screw does not contact said girth ring.

12. Apparatus for centrifugally lining hollow cylinders comprising, in combination, a jacket, runner rings for revolvably supporting said jacket, a pair of demountable end rings having peripheral surfaces for engaging interior surfaces of said runner rings, means cooperating with each of said end rings and the wall of a hollow cylinder to be lined for sealing the inerior of said hollow cylinder adjacent its ends against flow of fluid between said hollow cylinder and said demountable end rings during their rotation, means extending inwardly from said end rings for determining the length of lining material to be applied interiorly of the hollow cylinder, a girth ring for encircling the hollow cylinder intermediate its ends, and a plurality of devices for engaging said girth ring, said engaging devices being carried by said jacket and spaced circumferentially about said jacket opposite said girth ring, said engaging devices including a screw passing inwardly of said jacket and adjustable from the exterior of said jacket for contacting said girth ring.

13. In apparatus for centrifugally lining hollow cylinders, the combination comprising a cylindrical jacket including a runner ring at each end thereof, demountable rings mounted in annular openings in said runner rings and having walls square to the axis of said jacket for engaging ends of cylinders which are square to the axis of said jacket, a cylinder having a square end supported by one of said demountable rings in abutting relationship with its wall and a bevelled end extending into said jacket, said bevelled end being adapted to support a bevelled end of a hollow cylinder to be lined whose other end is adapted to be supported by the other of said demountable rings, said first mentioned cylinder having a wall parallel to the two bevelled ends of said cylinders for determining the length of lining to be applied to said second-mentioned cylinder.

14. In apparatus for centrifugally lining hollow cylinders, the combination comprising a cylindrical jacket including a runner ring at each end thereof, demountable rings mounted in annular openings in said runner rings and having walls square to the axis of said jacket, a cylinder having one of its ends supported by one of said demountable rings and abutting the square wall of said demountable ring and having its other end extending into said jacket, said other end of said cylinder being adapted to support one end of a hollow cylinder to be lined whose other end is adapted to be supported by the other of said demountable rings and abutting the square wall of said other demountable ring, means carried by the inwardly extending end of one of said cylinders for joining the inwardly extending ends of said cylinders, and means at the inner ends of said cylinders for separating the interior walls of said cylinders.

15. Apparatus for centrifugally lining hollow cylinders comprising, in combination, a jacket, means for rotatably supporting said jacket, a pair of rings mounted in said jacket and having inner bearing surfaces for concentrically supporting a hollow cylinder to be lined at its ends, means associated with said jacket and said rings to hold said rings in cooperating relationship with said hollow cylinder, a girth ring surrounding a portion of said hollow cylinder intermediate its ends, said girth ring having surfaces equispaced from the exterior surface of said hollow cylinder, means carried by said jacket opposite said girth ring and having surfaces equi-spaced from the axis of revolution of said jacket, and a series of compound screw elements carried by said last named means for exerting radial pressure on said girth ring, each of said compound screw elements including an outside screw having a stem of such length as to bear on a surface of said girth ring when said outside screw is properly positioned with respect to a bearing surface of said last named means and the intermediate portion of said hollow cylinder is centered, and an inside screw for bearing upon said girth ring in the event the intermediate portion of said hollow cylinder has not been fully centered and the associated outside screw fails to make contact with said girth ring.

16. Apparatus for centrifugally lining hollow cylinders comprising, in combination, a jacket, means for rotatably supporting said jacket, a pair of rings mounted in said jacket and having inner bearing surfaces for concentrically supporting the ends of a hollow cylinder to be lined, means associated with said jacket and said rings to hold said rings in cooperating relationship with said hollow cylinder, a girth ring surrounding a portion of said hollow cylinder intermediate its ends, said girth ring having surfaces uniformly spaced from the exterior surface of said hollow cylinder, means for displacing said girth ring and surrounded portion of said hollow cylinder radially with respect to the ends of the hollow cylinder, said means comprising members carried by and circumferentially spaced about said jacket and adapted to bear upon said surfaces of said girth ring to radially displace the same and the intermediate portion of said hollow cylinder a predetermined distance, and means associated with each of said members for contacting said girth ring after its maximum radial displacement has been effected by said members.

17. Apparatus for centrifugally lining hollow cylinders comprising, in combination, a cylindrical jacket for containing a hollow cylinder, end rings engageable with the ends of a hollow cylinder, each of said end rings having bearing surfaces which cooperate with bearing surfaces on said jacket and enable relative displacement of said end rings longitudinally with respect to said jacket so that the end rings and hollow cylinder may be withdrawn in an axial direction from association with said jacket, and means carried by said jacket for holding said end rings and said hollow cylinder within said jacket, said means including a rotatable dog adapted to be positioned to hold at least one of said displaceable end rings against longitudinal displacement with respect to said jacket, a nut for clamping said dog against said end ring, and a weighted element connected with said dog and disposed to prevent rotation of said dog from holding position when said jacket is rotating even though said clamping nut loosens.

HUGH F. KENNISON.

REFERENCES CITED

The following references are of record in the file of this patent:

UNITED STATES PATENTS

| Number | Name | Date |
|---|---|---|
| 1,286,056 | Moir et al. | Nov. 26, 1918 |
| 1,471,262 | Heer | Oct. 16, 1923 |
| 1,525,878 | Moir et al. | Feb. 10, 1925 |
| 1,785,586 | Hume | Dec. 16, 1930 |
| 1,940,545 | Holmes | Dec. 19, 1933 |
| 2,108,371 | French | Feb. 15, 1938 |
| 2,189,071 | Kopp | Feb. 6, 1940 |

OTHER REFERENCES

Ser. No. 320,199, Guerci (A. P. C.) pub. Apr. 27, 1943.